(12) United States Patent
Hirschberg et al.

(10) Patent No.: US 11,595,201 B2
(45) Date of Patent: Feb. 28, 2023

(54) SYSTEM AND METHOD FOR GENERATION OF A DISPOSABLE SOFTWARE MODULE FOR CRYPTOGRAPHIC MATERIAL PROTECTION

(71) Applicant: CYBER ARMOR LTD., Tel Aviv (IL)

(72) Inventors: Benyamin Hirschberg, Givat Zeev (IL); Leonid Sandler, Jerusalem (IL)

(73) Assignee: CYBER ARMOR LTD., Tel Aviv (IL)

( * ) Notice: Subject to any disclaimer, the term of this patent is extended or adjusted under 35 U.S.C. 154(b) by 249 days.

(21) Appl. No.: 16/797,234

(22) Filed: Feb. 21, 2020

(65) Prior Publication Data
US 2021/0266158 A1 Aug. 26, 2021

(51) Int. Cl.
| | |
|---|---|
| *H04L 9/08* | (2006.01) |
| *H04L 9/14* | (2006.01) |
| *H04L 67/50* | (2022.01) |

(52) U.S. Cl.
CPC .......... *H04L 9/0866* (2013.01); *H04L 9/0819* (2013.01); *H04L 9/0869* (2013.01); *H04L 9/0891* (2013.01); *H04L 9/14* (2013.01); *H04L 67/535* (2022.05)

(58) Field of Classification Search
CPC ..... H04L 67/22; H04L 9/0819; H04L 9/0861; H04L 9/0866; H04L 9/0869; H04L 9/0891; H04L 9/14
See application file for complete search history.

(56) References Cited

U.S. PATENT DOCUMENTS

| | | | | |
|---|---|---|---|---|
| 5,754,646 | A * | 5/1998 | Williams | G06F 21/123 |
| | | | | 705/57 |
| 9,064,127 | B2 * | 6/2015 | O'Hare | H04L 9/321 |
| 11,032,084 | B2 * | 6/2021 | Chan | G06F 8/65 |
| 2010/0036925 | A1 * | 2/2010 | Haffner | H04L 51/28 |
| | | | | 709/206 |

(Continued)

FOREIGN PATENT DOCUMENTS

| | | |
|---|---|---|
| CN | 109067528 | 12/2018 |
| EP | 1412862 | 4/2004 |

(Continued)

OTHER PUBLICATIONS

Search Query Report from IP.com (performed Apr. 8, 2022) (Year: 2022).*

(Continued)

*Primary Examiner* — Sharon S Lynch
(74) *Attorney, Agent, or Firm* — Pearl Cohen Zedek Latzer Baratz LLP (57) ABSTRACT

Systems and methods of generating a software module, including: receiving a cryptographic key identification (ID) and a cryptographic operation type from at least one executable program, generating a software module configured to perform the cryptographic operation with a cryptographic key, sending the software module to the at least one executable program, and performing the operation having the cryptographic operation type with the software module, wherein the software module is generated based on at least one of: a transformation of the cryptographic key corresponding to the received cryptographic key ID, and the received cryptographic operation.

16 Claims, 4 Drawing Sheets

(56) References Cited

U.S. PATENT DOCUMENTS

| | | | | |
|---|---|---|---|---|
| 2014/0150120 A1* | 5/2014 | Orsini | ............... | G06F 21/602 |
| | | | | 726/30 |
| 2018/0205711 A1* | 7/2018 | Kumar | ............... | G06F 21/602 |
| 2020/0186359 A1* | 6/2020 | Chan | ............... | H04L 9/3273 |
| 2020/0356642 A1* | 11/2020 | Knutsson | ............... | H04L 9/14 |
| 2021/0409229 A1* | 12/2021 | Chan | ............... | H04L 9/3273 |

FOREIGN PATENT DOCUMENTS

| | | | | |
|---|---|---|---|---|
| EP | 3836478 | * 10/2019 | ............ | H04L 9/08 |
| WO | WO 2016/112338 | 7/2016 | | |
| WO | WO 2019/149797 | 8/2019 | | |

OTHER PUBLICATIONS

AWS Key Management Service, Developer Guide, p. 1-50 & 427-428 (Nov. 25, 2019) (Year: 2019).*

Search Query Report from IP.com (performed Oct. 20, 2022) (Year: 2022).*

Elad Barkan and Eli Biham, "In How Many Ways Can You Write Rijndael?", In: Zheng Y. (eds) Advances in Cryptology—ASIACRYPT 2002, ASIACRYPT 2002, Lecture Notes in Computer Science, vol. 2501, pp. 159-176, Springer, Berlin, Heidelberg.

International Search Report for Application No. PCT/IL2021/050187, dated Jun. 10, 2021.

\* cited by examiner

SYSTEM AND METHOD FOR GENERATION OF A DISPOSABLE SOFTWARE MODULE FOR CRYPTOGRAPHIC MATERIAL PROTECTION

FIELD OF THE INVENTION

The present invention relates to disposable software modules. More particularly, the present invention relates to systems and methods for generation of a disposable software module during software runtime.

BACKGROUND OF THE INVENTION

Encryption of data at transit and at rest has become common practice in the Information security field, for instance as a protection mechanism against data theft. For example, some web browsers enforce Transport Layer Security (TLS) or Secure Sockets Layer (SSL) security on web connections by labeling sites who are not supporting such encryption as "not secure" for the end user. In such environments where data is constantly encrypted, it has become important to protect the encryption keys as well, not just the data itself.

Typically, all data encryption and decryption operations are performed by software. In some cases, hardware-based acceleration may be utilized as well. These software implementations in most cases use available libraries for cryptographic functionality. Such libraries are based on canonical implementation of the cryptographic algorithms. These libraries are incorporated into wide variety of software development frameworks and languages.

Accordingly, the majority of modern software product, being open source or closed, relies heavily on canonical implementation of cryptographic algorithms. These algorithms receive and/or store the keys in the random access memory (RAM) in a form that is well known (e.g., canonical form). If attackers get access to the memory, they can steal the keys without engaging in expensive and lengthy reverse engineering and use them with any other implementation of the same algorithm to decrypt the desired data.

In some cases, software obfuscation is applied in order to make a key recognition in the memory more difficult. This can be done, for example, using obfuscating compilers. Such a method, however, is applied during the software development process and therefore remains constant during the entire software lifecycle. Therefore, the attackers can repetitively steal the keys from the memory after a single reverse engineering procedure. However, the behavior of obfuscating compilers is becoming more and more predictable to experienced attackers. Another problem with this approach is that generic obfuscating compilers are not aware of the underlying cryptographic algorithms and therefore they cannot be as effective as an algorithm specific obfuscation.

Another technology for cryptographic key protection involves usage of external processing entities such as hardware security modules (HSM). Such external entity provides an interface for encryption and decryption of data using the secret key. Since the primary goal of the encryption is to protect data, the external entities method shifts the problem from the runtime key protection to the entity interface access protection. Any intrusion method that was able to steal the key from the memory in the canonical implementation case, is now able to access the external interface and request to decrypt necessary data. Therefore, the HSM based protection methods has very narrow applicability.

SUMMARY OF THE INVENTION

There is thus provided, in accordance with some embodiments of the invention, a method of generating a software module, the method including: receiving, by a processor, a cryptographic key identification (ID) and a cryptographic operation type from at least one executable program, generating, by a cryptographic code generator, a software module configured to perform the cryptographic operation with a cryptographic key, sending, by the processor, the software module to the at least one executable program, and performing, by the at least one executable program, the operation having the cryptographic operation type with the software module. In some embodiments, the software module may be generated based on at least one of: a transformation of the cryptographic key corresponding to the received cryptographic key ID, and the received cryptographic operation type.

In some embodiments, the software module may include a unique implementation of the cryptographic operation type. In some embodiments, the software module may include a unique implementation of the cryptographic key. In some embodiments, a secure communication channel to at least one executable program may be generated, wherein the software module is sent to the at least one executable program via the generated secure communication channel.

In some embodiments, the software module may include a different form of the cryptographic operation type compared to the received cryptographic operation type. In some embodiments, the cryptographic operation type may include at least one of authentication, encryption and decryption. In some embodiments, the cryptographic key corresponding to the received cryptographic key ID, may be split into random parts while retaining its original execution logic at the at least one executable program. In some embodiments, key space shifting may be performed on the cryptographic key, corresponding to the received cryptographic key ID, while retaining its original execution logic at the at least one executable program. In some embodiments, a cryptographic key corresponding to the received cryptographic key ID may be retrieved from a database.

In some embodiments, the operation having the cryptographic operation type may be performed for the received at least one executable program during runtime of the at least one executable program. In some embodiments, a time limit may be assigned for the software module. In some embodiments, a number of uses limit may be assigned for the software module.

There is thus provided, in accordance with some embodiments of the invention, a system for generation of a software module, the system including: at least one executable program, a processor, configured to receive a cryptographic key identification (ID) and a cryptographic operation type, from the at least one executable program, and a cryptographic code generator, configured to: generate a software module configured to perform the operation having the cryptographic operation type with a cryptographic key, send the software module to the at least one executable program, and perform the operation having the cryptographic operation type with the software module. In some embodiments, the software module may be generated based on at least one of: a transformation of the cryptographic key corresponding to the received cryptographic key ID, and the received cryptographic operation type.

In some embodiments, the software module may include a unique implementation of the cryptographic operation type. In some embodiments, the software module may include a unique implementation of the cryptographic key. In some embodiments, the processor may be configured to generate a secure communication channel to at least one executable program, and wherein the software module is sent to the at least one executable program via the generated secure communication channel In some embodiments, each software module may include a different form of the cryptographic operation type. In some embodiments, the cryptographic operation type may include at least one of authentication, encryption and decryption. In some embodiments, the operation having the cryptographic operation type may be performed for the received at least one executable program during runtime of the at least one executable program.

There is thus provided, in accordance with some embodiments of the invention, a method for automatically generating software, the method including: receiving from at least one executable program: a cryptographic key identification (ID); and a type of a cryptographic algorithm, creating a cryptographic module, to perform the cryptographic algorithm with a cryptographic key, receiving the cryptographic module by the at least one executable program, and performing the cryptographic algorithm with the cryptographic operation module. In some embodiments, the cryptographic operation module may be created using at least one of: a transformation of the cryptographic key corresponding to the received cryptographic key ID, and the received cryptographic operation type.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
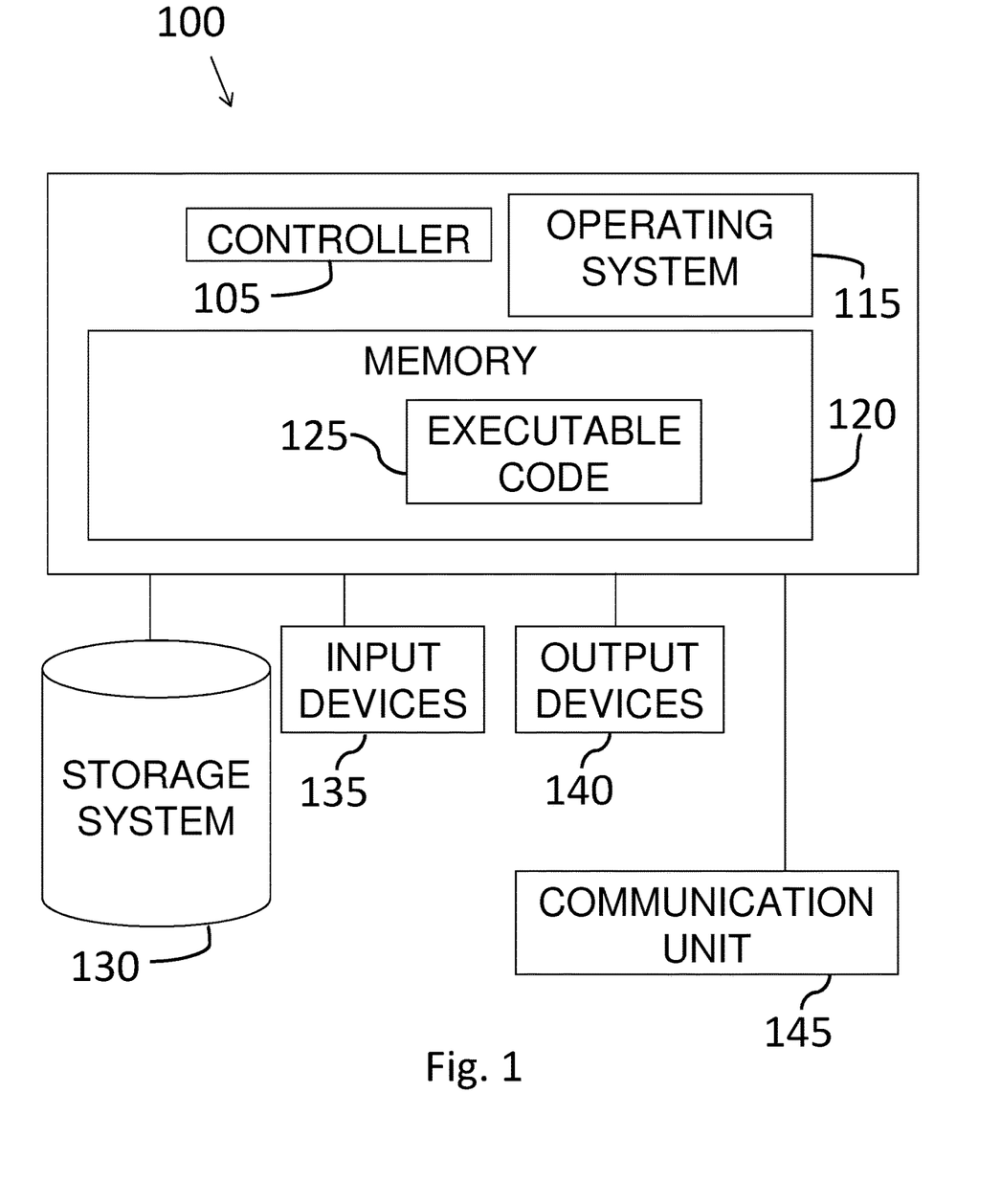
FIG. 1 shows a block diagram of an exemplary computing device, according to some embodiments of the invention.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Methods and systems according to some embodiments of the invention may provide protection of cryptographic materials during runtime by automatically creating or generating a unique disposable software module that consolidates the encryption and decryption operations, with a key protection measures inside a single software unit, for instance with a short lifecycle. In such a system, a disposable implementation of a cryptographic algorithm may be created for every cryptographic operation type, where the disposable code is different for every operation and for instance continuously renewed. Such embodiments may improve data protection by for example significantly reducing the windows of opportunity for a potential attacker to attempt to reverse engineer the system and steal cryptographic materials (e.g., steal cryptographic keys).

Figure 2:
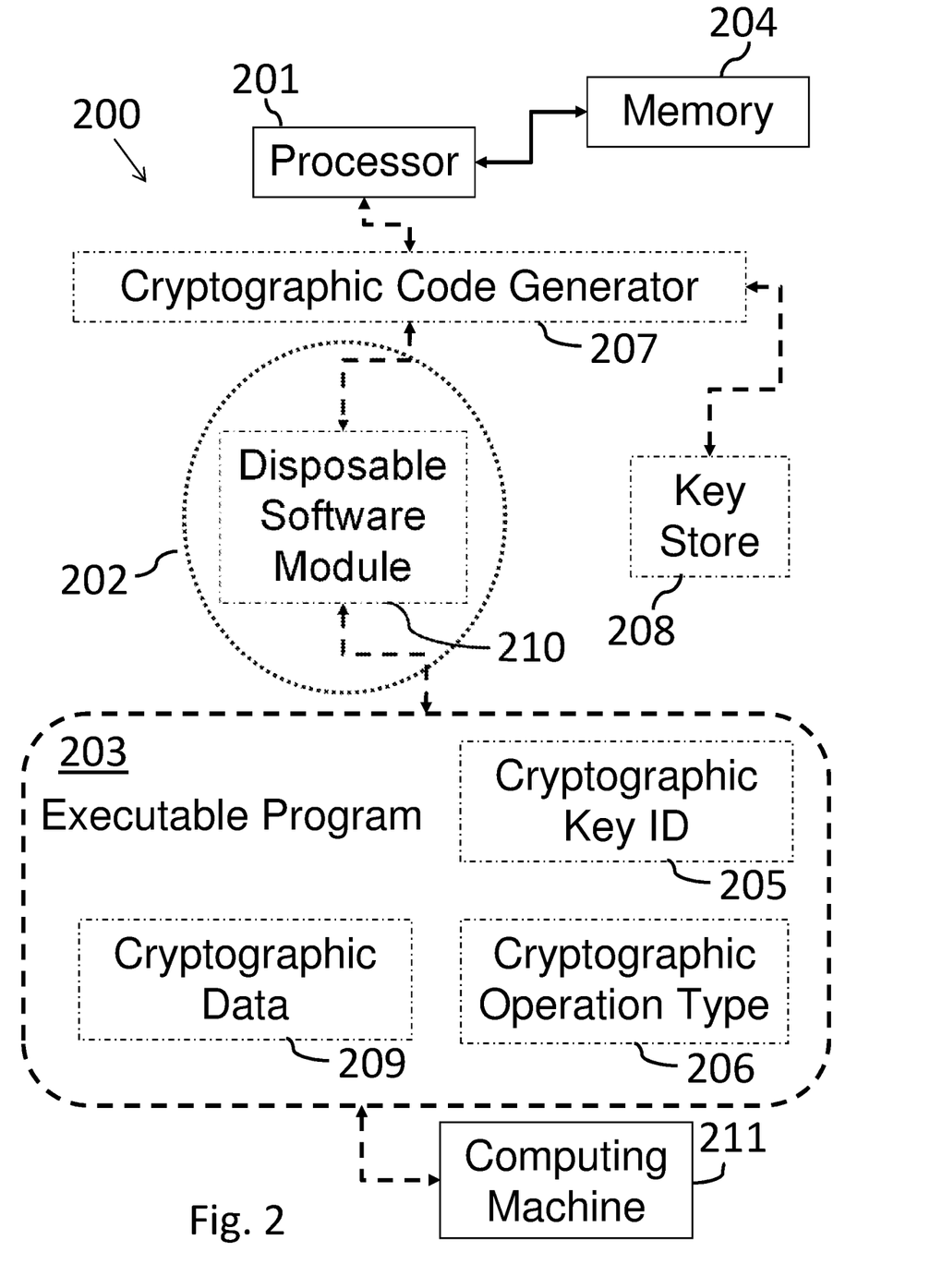
FIG. 2 shows a block diagram of a system for generation of a disposable software module, according to some embodiments of the invention.

Reference is now made to FIG. 2, which shows a block diagram of a system 200 for generation of a disposable software module 210, according to some embodiments. In FIG. 2, hardware elements are indicated with a solid line and the direction of arrows may indicate the direction of information flow.

The system 200 may include a processor 201 (e.g., such as controller 105 shown in FIG. 1) configured to execute a program (e.g., such as executable code 125 shown in FIG. 1) to generate or create a secure communication channel 202 between the processor 201 and at least one executable program 203. For example, the secure communication channel 202 may be created as an additional and/or secure (e.g., software) environment for data transfer, to provide secure communication by encrypting/decrypting all transferred data with a dedicated encryption scheme. The at least one executable program 203 may be executed by a computing machine 211. The at least one executable program 203 may be any software which requires cryptographic operations (e.g., encryption, decryption, signing, authentication etc.). The system 200 may be configured to protect sensitive cryptographic materials (e.g., cryptographic keys) of the at least one executable program 203, for instance to prevent malicious attempts to steal cryptographic keys.

Processor 201 may be in communication with a plurality of executable programs 203, for instance with each executable program 203 implemented and executed on a separate computer or machine 211 (e.g., at a different location), where processor 201 may execute code to provide protection of cryptographic material for each of the executable programs 203.

In some embodiments, the at least one executable program 203 may be carried or executed on the same machine that includes processor 201, where the processor 201 may be implemented and included in the machine (not shown in FIG. 2).

In some embodiments, the system 200 may include a memory module 204 (e.g., such as memory 120 shown in FIG. 1) coupled to the processor 201 and configured to store data therefrom (e.g., store cryptographic operation types).

In some embodiments, processor 201 may receive a cryptographic key identification (ID) 205 and a corresponding cryptographic operation description or type 206 (e.g., encryption and/or decryption algorithms such as the advanced encryption standard (AES)), from the at least one executable program 203. For example, the at least one executable program 203 may communicate information including the cryptographic key ID 205 via the secure communication channel 202. The cryptographic operation type 206 may be a cryptographic operation such as encryption, decryption, signing, authenticating, etc. and the corresponding algorithm type of the operation (e.g., encryption with the AES algorithm) since operation with different algorithm types may cause a different result. Symmetric cryptographic algorithm categories or types may for example include advanced encryption standard (AES) and data encryption standard (DES). Asymmetric cryptographic algorithm types may include Rivest-Shamir-Adleman (RSA), digital signature algorithm (DSA), elliptic-curves (ECC), and El-Gammal Signature and verification algorithm types or processes may include RSA, DSA, hash-based message authentication code (HMAC), and ECC.

The cryptographic key ID 205 may correspond to a cryptographic key to perform the operation of the corresponding cryptographic operation type 206. The cryptographic key may be stored on the machine 211 and/or on an external device in communication with the machine 211. Thus, the processor may receive the cryptographic key ID 205 instead of the actual cryptographic key in order to prevent unnecessary sharing of the protected cryptographic material.

In some embodiments, the system 200 may include a disposable software module generator 207. The disposable software module generator 207 may be a cryptographic code generator configured to create or generate a disposable software module 210 (or cryptographic operation or algorithm module) to perform the operation having the cryptographic algorithm or operation type 206, as received from the at least one executable program 203. According to some embodiments, the secure communication channel 202 may be between the at least one executable program 203 and the cryptographic code generator 207. The disposable software module 210 may be created for a specific cryptographic operation type including a cipher and cryptographic key. In some embodiments, the disposable software module generator 207 may operate without cryptographic operations.

In some embodiments, the system 200 may include a key store 206 external to the processor 201 (e.g., implemented on a server) and/or external to the at least one executable program 203. The key store 206 may store cryptographic secrets or keys and map them by their identifier (e.g., key ID). For examples, the processor 201 may associate a received cryptographic key ID 205 to a corresponding cryptographic secret or key based on the key store 206. In some embodiments, the key store 206 may be coupled to the processor 201 and/or memory 204.

In some embodiments, the disposable software module 210, as generated by the cryptographic code generator 207, may not be required to deliver the key separately from the code (e.g., in a 'keyless' manner) such that there is no need for another cryptographic key to decipher data. Thus, the possibility of a malicious attack to "steal" the cryptographic keys may be prevented since no keys (other than those of the at least one executable program 203) are used to decipher the data, as described herein. In some embodiments, the disposable software module 210 may be generated for each implementation and/or for each cryptographic operation, such that for every two disposable software modules 210 (e.g., generated at different occurrences), the software modules 210 may be are sufficiently different from each other. For example, the cryptographic code generator may store a long list of different segments of computer code and a disposable software module may be generated to be different (e.g., selected from a large list of possible sections of computer codes) such that a potential attacker that deciphers a first disposable software module may not be able to apply the deciphered data for a second disposable software module, thereby preventing automation of reverse engineering by the potential attacker. In some embodiments, the disposable software module 210 may be frequently and/or proactively updated, for instance such that the required time for reverse engineering to decipher the data may be longer than the life cycle of the disposable software module 210.

The cryptographic code generator 207 may generate a unique instance of the disposable software module 210, for instance a disposable machine code implementation of cryptographic algorithm (e.g., for encryption, decryption, signing or verification), and its corresponding cryptographic material.

In some embodiments, each disposable software module 210 may include a unique implementation (e.g., intended to be not identical to another implementation in the particular environment in which the particular embodiment is used) of a cryptographic algorithm and/or material such that the disposable software module 210 may be generated uniquely for each use (e.g., selected from a large list of possible code segments or generated with at least one random parameter). After completion of the cryptographic operation, the disposable software module 210 may be deleted. The cryptographic code generator 207 may send or transmit the disposable software module 210 to the at least one executable program 203, for example via the generated secure communication channel 202.

According to some embodiments, the disposable software module 210 may perform the operation having the cryptographic operation algorithm or type 206 with the at least one executable program 203 (e.g., encryption, decryption, etc. for the at least one executable program 203). The disposable software module 210 may be (e.g., automatically) created or generated (by the cryptographic code generator 207) based on or using a transformation of a cryptographic key corresponding to the received cryptographic key ID 205 and/or based on the received cryptographic operation type 206. For example, the disposable software module 210 may be generated with code segments corresponding to the received cryptographic operation type 206, such that the software module 210 may include a different form of the cryptographic operation type 206. In another example, the disposable software module 210 may be generated with code segments corresponding to a transformation of a cryptographic key (e.g., code segments that cannot be deciphered without knowledge of the correct transformation), where the cryptographic key corresponds to the received cryptographic key ID 205.

According to some embodiments, for every cryptographic material (e.g., cryptographic key) the system 200 may create at least one disposable software module 210 which is a pseudo-unique implementation of the algorithm that cannot be predicted by another party, such that no two disposable software modules 210 may be used with the same algorithm implementation. In some embodiments, the at least one disposable software module 210 may be randomly chosen from a (substantially large) list of predefined software modules. This disposable modules' use may be limited in time and/or limited in number of transactions in order to prevent replay attacks, for instance limiting the exposure of the disposable software module 210. Attacking such a system for stealing cryptographic material may therefore be not practical, since even for a group of potential attackers there will be a need to invest complex work in order for reverse engineering.

The cryptographic code generator 207 may be configured to generate a (pseudo) unique representation of cryptographic keys and the cryptographic algorithm and accordingly produce machine code that the at least one executable program 203 may execute. In some embodiments, there are no two machine code implementation generated by the cryptographic code generator 207 that look or function the same.

In some embodiments, the disposable software module implements the moving target paradigm, where the attacker needs to reverse engineer the disposable software module manually in order to understand the non-canonical algorithm variation and recreate the canonical key. Reverse engineering is a resource consuming process while the investment (time and resources) in generation and distribution of a new disposable software module is smaller by orders of magnitude than breaking a given instance of a disposable software module. According to some embodiments, the system 200 may generate the at least one disposable software module 210 such that the system 200 may be a 'keyless' system, where no cryptographic key is exchanged between the cryptographic code generator 207 and the at least one executable program 203. Accordingly, the system 200 may provide key protection for the at least one executable program 203, while performing the required cryptographic operation.

According to some embodiments, the encryption algorithm coupled with key protection may be separated from the main executable program (at the at least one executable program 203), such that data between the main executable program with the processor 201 may not be shared at all. It should be noted that in contrast to the traditional methods described above, having executable program with encryption algorithm that only get the cryptographic keys from the outside, the system 200 may provide key protection by separation between the executable program 203 and the encryption algorithm using the at least one disposable software module 210.

Figure 3:
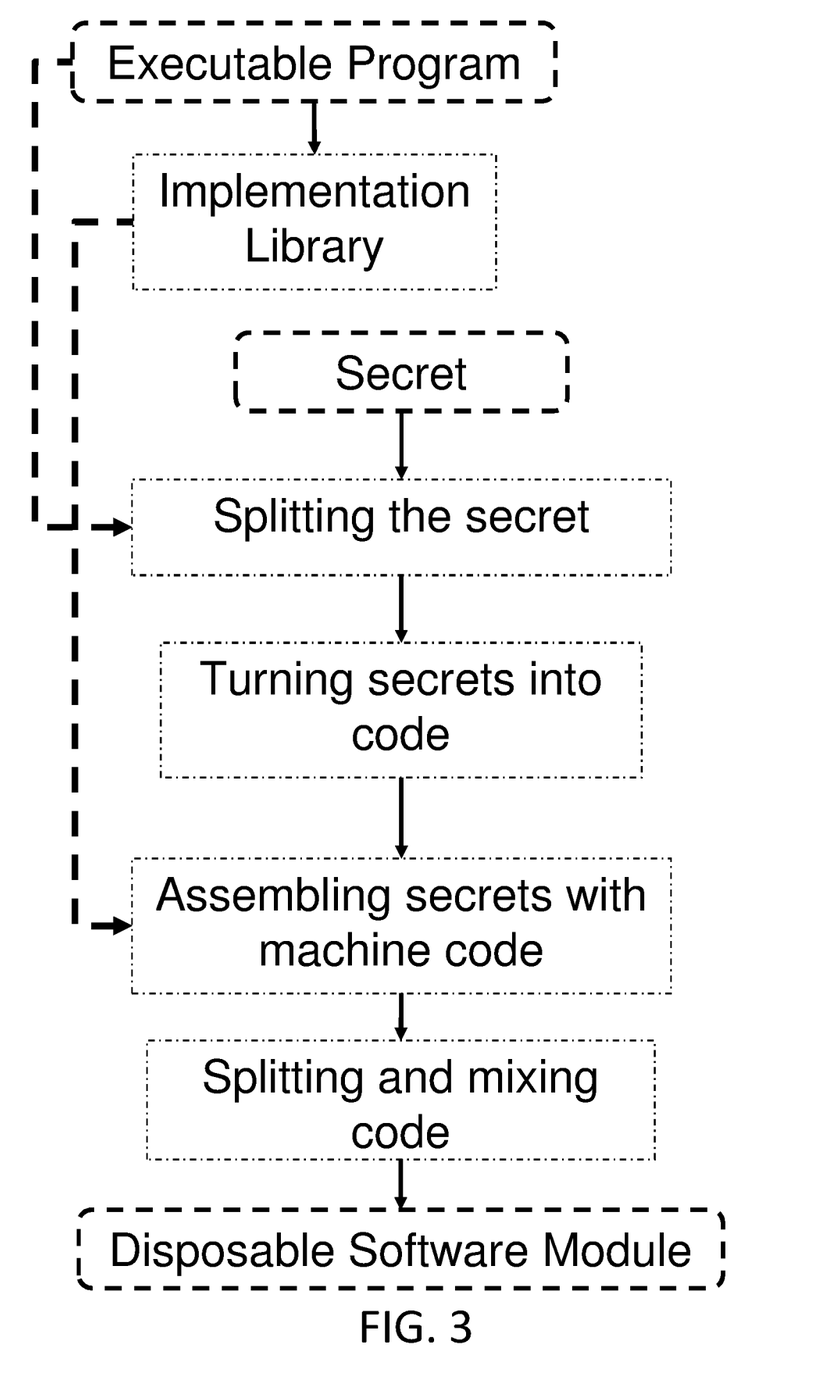
FIG. 3 schematically illustrates a flowchart of generating a disposable cryptographic code, according to some embodiments of the invention.

Reference is now made to FIG. 3, which schematically illustrates a flowchart of generating a disposable cryptographic code, according to some embodiments.

The implementation library may hold or store lists of machine code implementations of cryptographic algorithm primitives. These lists may be organized by dedicated algorithms into groups according to the functionality they accomplish.

In some embodiments, the executable program may communicate with an implementation library, where using the algorithm type the cryptographic code generator may choose implementations from the implementation library in order to produce a specific implementation. The cryptographic code generator may take the secret and according to the type of the cryptographic operation may split the key into different parts. The cryptographic code generator may take the key parts and transform them one by one into a form of code which if ran or executed will generate the key part. Thus, the cryptographic code generator may take the executable program implementation and embed the code chunks in the executable program. In some embodiments, the machine code may be split to random parts and stored in memory in random places while retaining its original execution logic when called for execution in the correct order, for example with each split part having dedicated serial identification number for the correct order of execution.

The input of generating a disposable software module may be a secret (e.g., the key ID or a 16 bytes of advanced encryption standard (AES) key) and an algorithm (e.g., an AES decryption) with the result of the disposable software module (in this example machine code implementation of AES decryption with the aforementioned 16 bytes of key). For example, AES algorithm may use the following atomic operations: KeyExpand, ShiftRows, MixColumns, AddRoundKey and Substitute bytes. The implementation library may include different binary implementations of each of them organized into five sets corresponding the five atomic operations. In order to execute an AES algorithm each of these five operations may run eleven times. When the implementation library needs to produce a single AES algorithm implementation it may choose from the implementation sets 55 (e.g., 5*11) times randomly to build the complete algorithm. In case the library has ten different implementations of the AES library, such embodiments may be able to create 55^10~253×10^15 different implementation of AES Similar implementations may apply for data encryption standard (DES), Rivest-Shamir-Adleman (RSA) cryptosystem, etc.

When the secret (e.g., the cryptographic key) is split, the secret may be taken from its original (or "canonical") form and be prepared for direct use by the executable program in a non-trivial form so the secret as a whole or parts of it may not be used in its original form. The secrets may be used in an iterative manner during the calculation of the cryptographic algorithms During these iterations different parts of the secrets may be used. In some embodiments, splitting keys into different parts may enable the system to load these parts at different points in time to the memory and make the system more complex to attack. According to some embodiments, cryptographic keys may not be stored in a non-canonical form in the memory (e.g., in the RAM) in the system 200.

In some embodiments, the cryptographic code generator may break symmetric keys into multiple parts and generate a code which combines them together. For every disposable software module, the key parts and their combination operations may be different and therefore a reverse engineering may not see the same key transformation twice but a sequence of random key parts and operation resulting in canonical algorithm results but non canonical keys and implementation.

In some embodiments, instead of splitting the keys, key space shifting may be employed. Key space shifting is a formal definition of the requirement of not having keys in their standard form. Given an algorithm E, key $k \in K$ where K is a set of all potential keys, plaintext $p \in P$ and ciphertext $c \in C$ where $\forall k, c, p\ E(k, p)=c$. A shifted key space $E^*$, implementation of E, may be defined as: $\forall k \exists k^* \rightarrow E^*(k^*, p)=c=E\ (k, p)$.

According to some embodiments, data may be transformed into code in order to transform the keys from their binary representation to a representation that is unpredictable by a potential attacker. Thus, in order to get this data for a potential attacker the code itself needs to be executed. The cryptographic code generator may implement a number of different representations and choose randomly one per the data type it needs to transform or convert. In some embodiments, key space shifting may be performed on the cryptographic key, corresponding to the received cryptographic key ID, while retaining its original execution logic at the at least one executable program.

One example of creating unpredictable code which results in a number, when executing, is to create equations with random numbers and random operations. In this example 32-bit integer numbers are used with addition and subtraction. Given a secret 'X' which may be handled as 32-bit integer:

| Step | Operation to X | Resulting code |
|---|---|---|
| 1: picking + and number a | X + a | sub R, a |
| 2: picking − and number b | (X + a) − b | add R, b |
|  |  | sub R, a |
| 3: picking − and number c | ((X + a) − b) − c | add R, c |
|  |  | add R, b |
|  |  | sub R, a |
| 4: final step (R results in X after executing code) | mov R, ((X + a) − b) − c |
|  |  | add R, c |
|  |  | add R, b |
|  |  | sub R, a |

Any number may be transformed this way using random number of steps and where every step may use a random operand and a random operator (which is reversible). Thus, any secret and/or partial secret may be transformed to code. It should be noted that at least some of the operations may not be fully random (e.g., selected from a substantially large list). In some embodiments, the cryptographic code generator may include a library of machine code implementation of cryptographic algorithms it supports. For the same algorithm it may have different implementations so it may use different implementations per request for the same algorithm.

Figure 4:
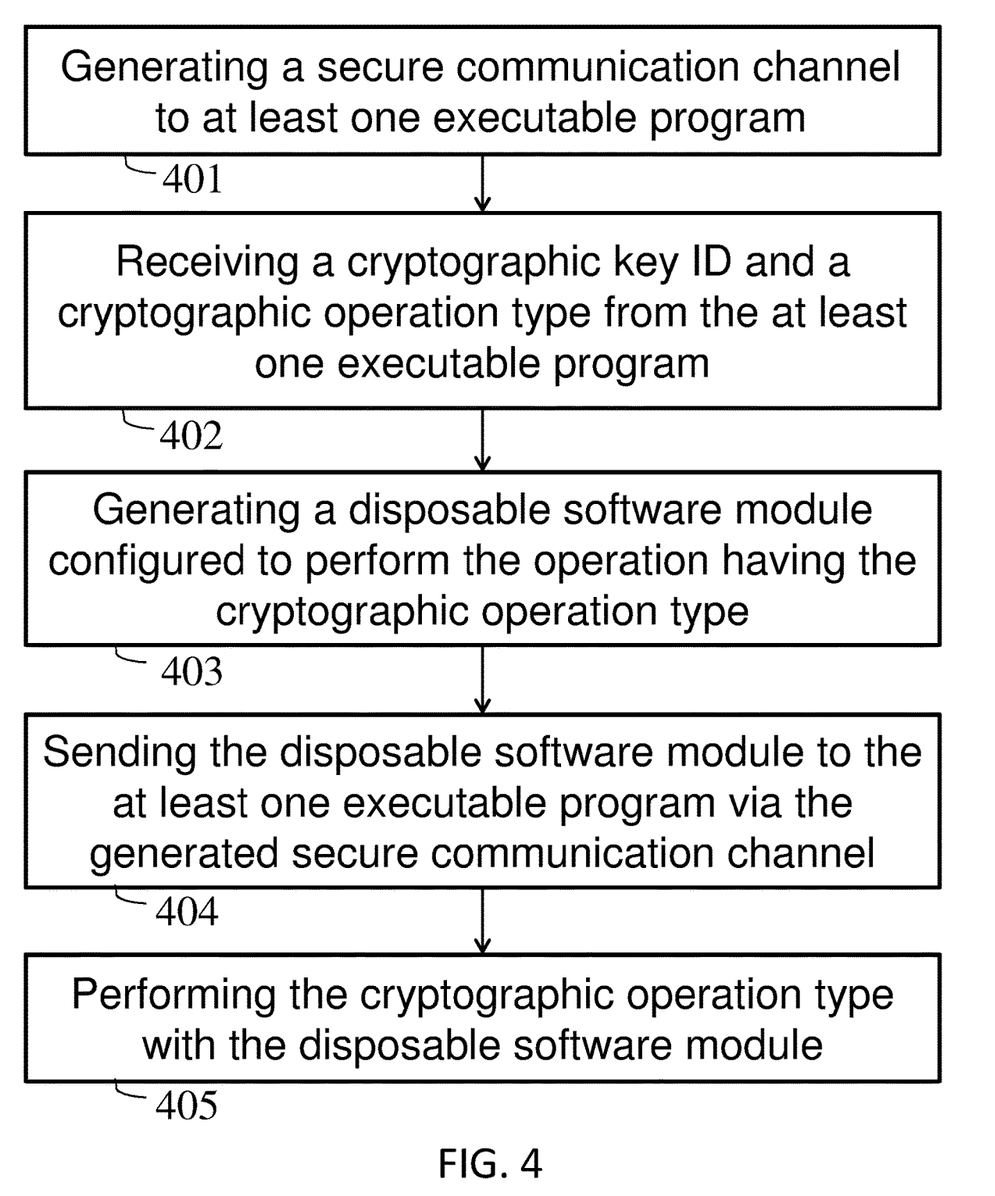
FIG. 4 shows a flowchart of a method of generating a disposable software module, according to some embodiments of the invention.

It should be noted that as opposed the hardware security-based solutions like a hardware security module (HSM) and a trusted execution environment (TEE) implementations, the system 200 may not require hardware level support and may be implemented on every general-purpose CPU and software Reference is now made to FIG. 4, which shows a flowchart of a method of generating a disposable software module, according to some embodiments. In Step 401, a secure communication channel to at least one executable program may be generated (e.g., by the processor).

In Step 402, a cryptographic key ID and a cryptographic operation type may be received (e.g., by the processor) from the at least one executable program. In Step 403, a disposable software module may be generated (e.g., by the cryptographic code generator), where the disposable software module may be configured to perform the operation having the cryptographic operation type.

In Step 404, the disposable software module may be sent (e.g., by the processor) to the at least one executable program via the generated secure communication channel In Step 405, the operation having the cryptographic operation type may be performed (e.g., by the at least one executable program) with the disposable software module.

In some embodiments, the disposable software module may be generated based on a transformation of a cryptographic key corresponding to the received cryptographic key ID and the cryptographic operation type.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of generating a software module, the method comprising:
   receiving, by a processor, a cryptographic key identification (ID) and a cryptographic operation type from at least one executable program;
   generating, by a cryptographic code generator, a software module configured to perform with a cryptographic key the cryptographic operation having the cryptographic operation type, wherein generating the software module further comprises splitting or key space shifting the cryptographic key by the cryptographic code generator according to the received cryptographic key ID and the cryptographic operation type;
   sending, by the processor, the software module to the at least one executable program, wherein an original execution logic of the cryptographic key is retained at the at least one executable program; and
   performing, by the at least one executable program and with the software module, the cryptographic operation having the cryptographic operation type,
   wherein the software module is deleted after completion of the cryptographic operation or expiration of a limit on the time or permitted number of uses for the software module.

2. The method of claim 1, wherein the software module comprises a unique implementation of the cryptographic operation type.

3. The method of claim 2, wherein the software module further comprises a unique implementation of the cryptographic key.

4. The method of claim 1, further comprising generating, by the processor, a secure communication channel to at least one executable program, wherein the software module is sent to the at least one executable program via the generated secure communication channel.

5. The method of claim 1, wherein the software module comprises a different form of the cryptographic operation type compared to the received cryptographic operation type.

6. The method of claim 1, wherein the cryptographic operation type comprises at least one of authentication, encryption and decryption.

7. The method of claim 1, further comprising retrieving, from a database, a cryptographic key corresponding to the received cryptographic key ID.

8. The method of claim 1, wherein the operation having the cryptographic operation type is performed for the received at least one executable program during runtime of the at least one executable program.

9. A system for generation of a software module, the system comprising:
   at least one executable program;
   a memory;
   a processor, configured to receive a cryptographic key identification (ID) and a cryptographic operation type, from the at least one executable program; and
   a cryptographic code generator, configured to:
      generate a software module, configured to perform with a cryptographic key a cryptographic operation having the cryptographic operation type, wherein generating the software module further comprises splitting or key space shifting the cryptographic key by the cryptographic code generator according to the received cryptographic key ID and the cryptographic operation type;

send the software module to the at least one executable program, wherein an original execution logic of the cryptographic key is retained at the at least one executable program; and perform with the software module the cryptographic operation having the cryptographic operation type, wherein the software module is deleted after completion of the cryptographic operation or expiration of a limit on the time or permitted number of uses for the software module.

10. The system of claim 9, wherein the software module comprises a unique implementation of the cryptographic operation type.

11. The system of claim 10, wherein the software module further comprises a unique implementation of the cryptographic key.

12. The system of claim 9, wherein the processor is further configured to generate a secure communication channel to at least one executable program, and wherein the software module is sent to the at least one executable program via the generated secure communication channel.

13. The system of claim 9, wherein each software module comprises a different form of the cryptographic operation type.

14. The system of claim 9, wherein the cryptographic operation type comprises at least one of authentication, encryption and decryption.

15. The system of claim 9, wherein the operation having the cryptographic operation type is performed for the received at least one executable program during runtime of the at least one executable program.

16. A method for automatically generating software, the method comprising:
  receiving from at least one executable program:
    a cryptographic key identification (ID); and
    a type of a cryptographic algorithm;
  creating a cryptographic operation module, to perform the cryptographic algorithm with a cryptographic key, wherein the cryptographic operation module is created by splitting or key shifting a cryptographic key according to the received cryptographic key ID and the type of the cryptographic algorithm;
  receiving the cryptographic operation module by the at least one executable program, wherein an original execution logic of the cryptographic key is retained at the at least one executable program; and
  performing, by the at least one executable program with the cryptographic operation module, the type of the cryptographic algorithm,
  wherein the cryptographic operation module is deleted after completion of the cryptographic algorithm or expiration of a limit on the time or permitted number of uses for the cryptographic module.

* * * * *